United States Patent [19]

Ohkubo et al.

[11] Patent Number: 5,315,462

[45] Date of Patent: May 24, 1994

[54] CARTRIDGE LOADING DEVICE HAVING SIDE-LOCKING MECHANISM

[75] Inventors: Hiroshi Ohkubo; Takashi Miyamoto, both of Tokyo, Japan

[73] Assignee: TEAC Corporation, Tokyo, Japan

[21] Appl. No.: 79,857

[22] Filed: Jun. 22, 1993

Related U.S. Application Data

[63] Continuation of Ser. No. 703,819, May 21, 1991, abandoned.

[30] Foreign Application Priority Data

Jun. 4, 1990 [JP] Japan .................. 2-59012[U]

[51] Int. Cl.⁵ .................. G11B 5/008; G11B 15/675
[52] U.S. Cl. .................. 360/96.5; 360/93
[58] Field of Search .................. 360/96.5, 96.6, 99.02, 360/99.06, 105, 130.21, 130.22; 369/77.1, 77.2

[56] References Cited

U.S. PATENT DOCUMENTS

| | | | |
|---|---|---|---|
| 4,373,172 | 2/1983 | Motoyama et al. | 360/105 |
| 4,441,133 | 4/1984 | Ogawa et al. | 360/130.22 |
| 4,636,890 | 1/1987 | Rudi et al. | 360/96.5 |
| 4,785,363 | 11/1988 | Jacobs et al. | 360/96.5 |
| 4,864,439 | 9/1989 | Duurland | 360/96.5 |
| 4,881,137 | 11/1989 | Meguro et al. | 360/96.5 |
| 4,933,796 | 6/1990 | Tanaka | 360/132 |
| 5,109,308 | 4/1992 | Kukreja et al. | 360/96.5 |

FOREIGN PATENT DOCUMENTS

| | | | |
|---|---|---|---|
| 1-88950 | 4/1989 | Japan | 360/96.5 |
| 2-236863 | 9/1990 | Japan | 360/96.5 |

Primary Examiner—Stuart S. Levy
Assistant Examiner—Jefferson Evans
Attorney, Agent, or Firm—Finnegan, Henderson Farabow, Garrett & Dunner

[57] ABSTRACT

A cartridge case having locking notches in both of its side faces is guided by guide rails when it is loaded into an information recording/reproducing apparatus. The cartridge case is locked in its prescribed loaded position by clampers which push the case from both sides thereof. Each clamper has a truncated-cone-shaped roller which is urged by a spring toward the center line of the apparatus and which pushes the insertion-side bottom edge of the locking notch.

4 Claims, 7 Drawing Sheets

CARTRIDGE LOADING DEVICE HAVING SIDE-LOCKING MECHANISM

This application is a continuation of application Ser. No. 07/703,819, filed May 21, 1991, now abandoned.

BACKGROUND OF THE INVENTION

The present invention relates to a cartridge loading device and, more particularly, to a cartridge loading device for loading a cartridge, which includes a case having locking notches at the front bottom portions of both of its side faces, an information recording tape wound around a pair of reels, and a drive roller (driven by the drive unit) for rotating the reels, into an information recording/reproducing apparatus having a drive unit.

Apparatuses such as a tape recorder and a data recorder, in which information is written in and read from an information recording tape (magnetic tape, etc.) incorporated in a cartridge, include a cartridge loading device for loading the cartridge into the main body of the apparatus. The cartridge under consideration is constituted as shown in FIGS. 9-11(b). The cartridge, in which the information recording tape is housed, is called a "data cartridge", for example.

Figure 9:
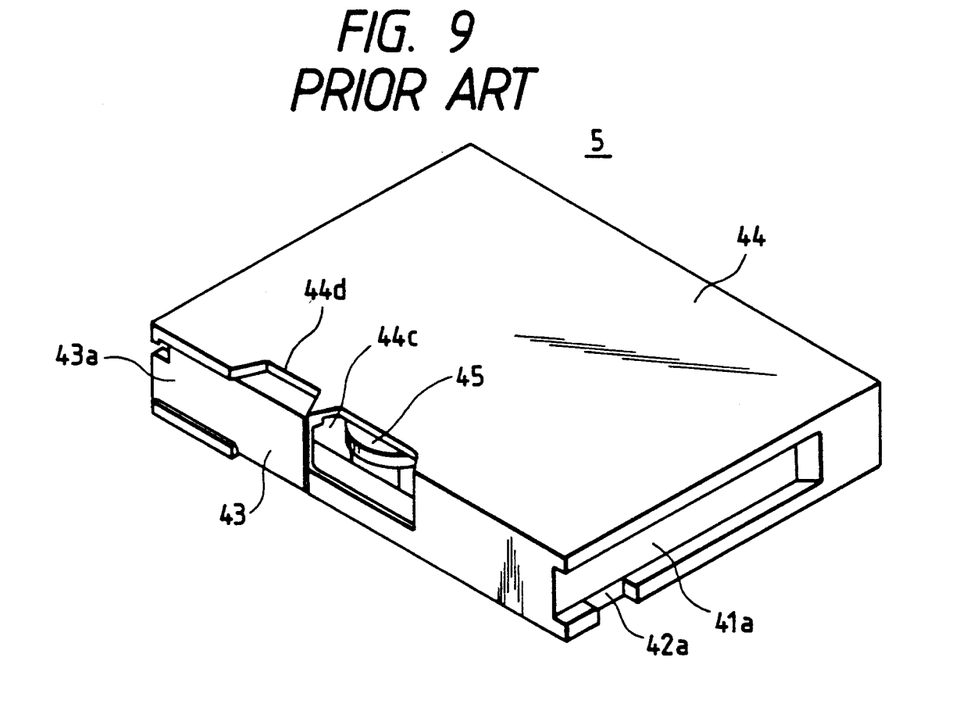
FIGS. 9 and 10 are perspective views of the cartridge.
Figure 10:
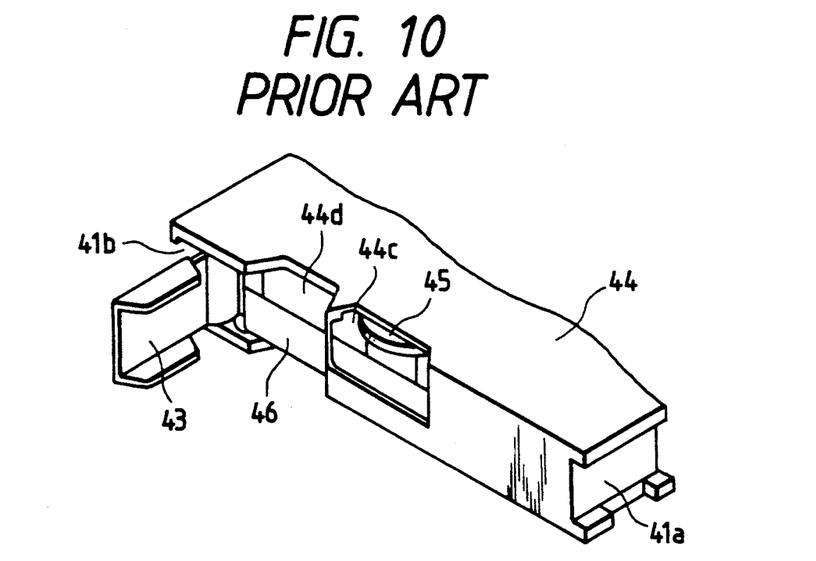

FIG. 9 is a perspective view showing the whole appearance of a data cartridge 5. FIG. 10 is a perspective view of the front portion of the data cartridge 5. Side faces of a case 4 of the cartridge 5 have guide grooves 41a and 41b, and locking notches 42a and 42b (notch 42b not shown in the figure) formed in the front portions of the bottom walls of the guide grooves 41a and 41b. The case 44 has, on its front side, openings 44c and 44d adjacent to each other, and the opening 44d is provided with a cover 43. The peripheral surface of a drive roller 45 provided in the case 44 is exposed from the opening 44c. The cover 43 is rotatably supported at the front corner of the case 44. The cover 43 is normally closed to prevent dust from entering the case 44. When an end 43a of the cover 43 is pushed to swing the cover 43 open as shown in FIG. 10, the information recording tape (hereinafter simply called "tape") 46 is exposed from the opening 44d.

Figure 11A:
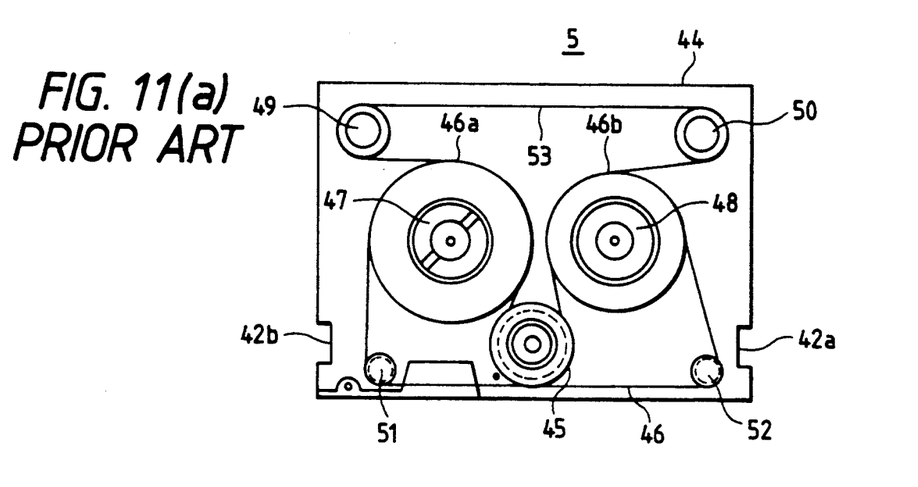
FIG. 11(a) is a cutaway plan view of the cartridge.
Figure 11B:
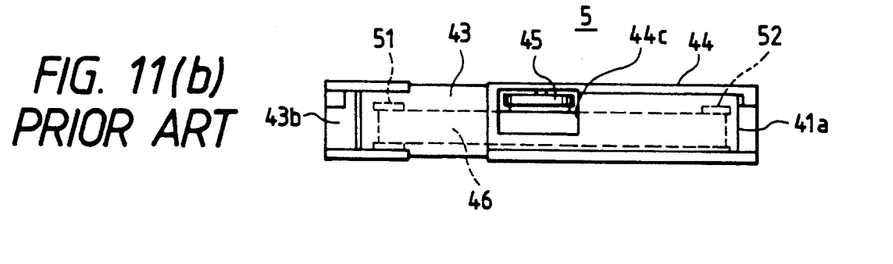
FIG. 11(b) is a front view of the cartridge.

The interior of the cartridge 5 is constituted as shown in FIGS. 11(a) and 11(b). A pair of reels 47 and 48, the drive roller 45 and a pair of guide rollers 49 and 50 are rotatably supported by respective shafts in the case 44. The tape 46 runs from the reel 47 to reel 48 and vice versa through tension rollers 51 and 52. A drive belt 53 is wound on the drive roller 45 and the guide rollers 49 and 50, and pressed against the respective outermost turns of the tape 46 wound around the reels 47 and 48. When the drive roller 45 is rotated to move the drive belt 53, the drive belt 53 applies tangential forces to respective portions 46a and 46b of the tape 46 around the reels 47 and 48 to rotate the reels 47 and 48 in the same direction, winding the tape 46 from one of the reels 47 and 48 to the other through the tension rollers 51 and 52. It is understood that, in the cartridge 5 of the above type, the tape 46 provided therein is driven by applying torque to the drive roller 45.

Figure 12:
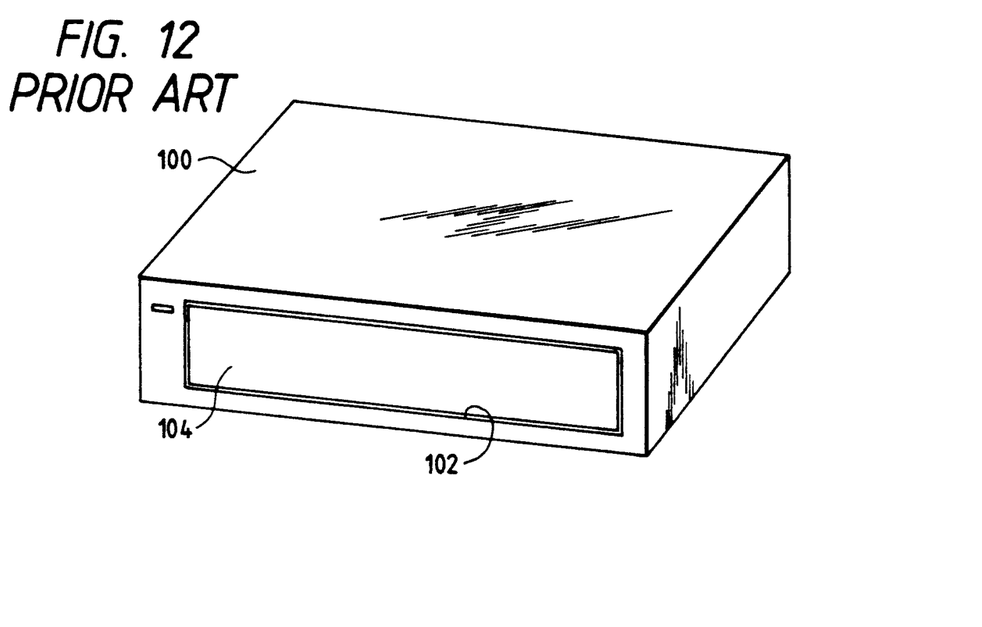
FIG. 12 is a perspective view of an information recording/reproducing apparatus.

FIG. 12 shows the typical appearance of an apparatus such as a data recorder, which has a built-in tape drive unit, and into which the cartridge 5 is loaded. An insertion opening 102 is formed in the front face of the main body 100 of the apparatus, and a cover 104 for the opening 102 is coupled to the apparatus main body 100 with a hinge at its upper portion. When the data cartridge 5 is inserted through the insertion opening 102 the cover 104 is pushed by the case 44 of the cartridge 5 and is thereby opened. When the cartridge 5 is pulled out of the main body 100, the cover 104 is automatically closed.

A cartridge loading device is disposed in the apparatus main body 100 together with the drive unit for driving the tape 46 in the cartridge 5.

The operational principle of a conventional cartridge loading device for the above cartridge 5 will be described below with reference to FIGS. 13(a)-13(c).

Figure 13A:
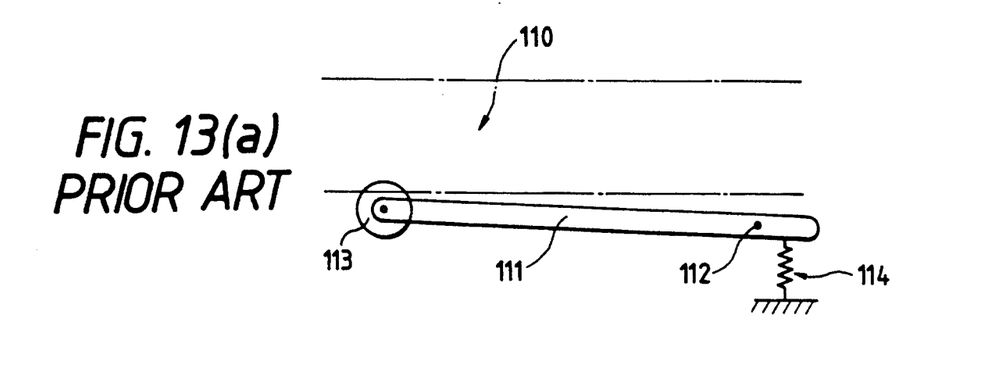
FIGS. 13(a), 13(b) and 13(c) are side views illustrating the operational principle of a conventional cartridge loading device.
Figure 13B:
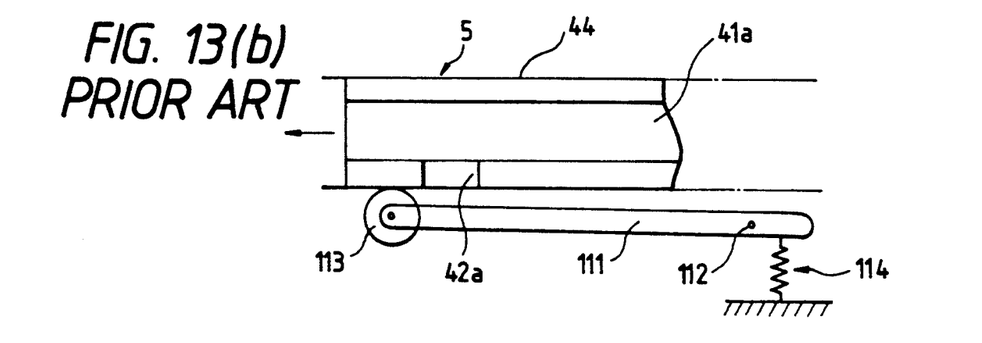
Figure 13C:
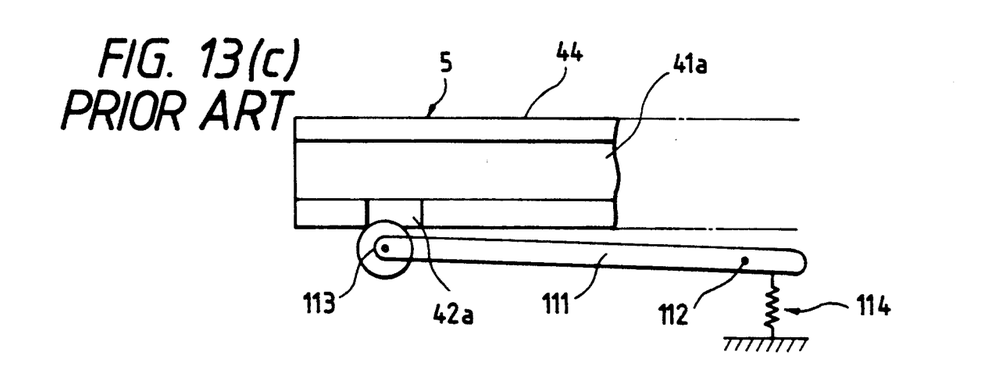

As shown in FIG. 13(a), an arm 111 is rotatably supported by a shaft 112 disposed under a loading space 110 into which the cartridge 5 is loaded. A rotatable roller 113 is provided at one end of the arm 111, and a spring 114 for urging the arm 111 downward is connected to the arm 111 at the other end.

The cartridge 5 is inserted through the insertion opening 102 of the apparatus main body 100, and then moves along the loading space 110. When the cartridge 5 has come to the vicinity of its final loaded position, the case 44 of the cartridge 5 advances while pushing down the roller 113, as shown in FIG. 13(b). At that time, the roller 113 is kept in contact with the bottom face of the case 44 by means of the pulling force of the spring 114. When the cartridge 5 has moved to its final loaded position, it is pushed at the edge of the locking notch 42a by the roller 113 due to the pulling force of the spring 114 as shown in FIG. 13(c), so that the cartridge 5 is pushed both upward and forward and locked in the apparatus main body 100.

It is noted that a loading mechanism similar to the one shown in FIG. 13(a) is provided on the opposite side in association with the locking notch 42b.

On the other hand, in the unloading operation, first the bottom face of the case 44 rides onto the roller 113, and then the cartridge 5 retreats along the loading space 110 to be pulled out of the insertion opening 102 of the apparatus main body 100.

However, the conventional cartridge loading device of the above type has a problem that it is difficult to reduce the thickness or height of the apparatus in which the loading device is incorporated. This is because the cartridge-locking mechanism including the arm 111, roller 113 and spring 114 is provided under the loading space 110, and the cartridge 5 is pushed up from its underside by a pushing member such as the roller 113.

SUMMARY OF THE INVENTION

Accordingly, an object of the present invention is to provide a cartridge loading device capable of loading a cartridge to its prescribed loaded position without using a mechanism that pushes up the cartridge from its underside.

A cartridge loading device according to the present invention is intended for loading a cartridge which includes a case having locking notches in both of its side faces and an information recording tape incorporated in the case into an information recording/reproducing apparatus which has a drive unit for transfer-driving the tape. The cartridge loading device is characterized by guide members for guiding the cartridge in loading it, and cartridge pushing members for locking the cartridge by entering the locking notches of the case from both sides of the case.

Since the cartridge pushing members push the cartridge from both sides thereof, the thickness or height of the information recording/reproducing apparatus can be reduced.

DESCRIPTION OF THE PREFERRED EMBODIMENTS

A cartridge loading device according to an embodiment of the present invention will be described with reference to FIGS. 1–8.

Figure 1:
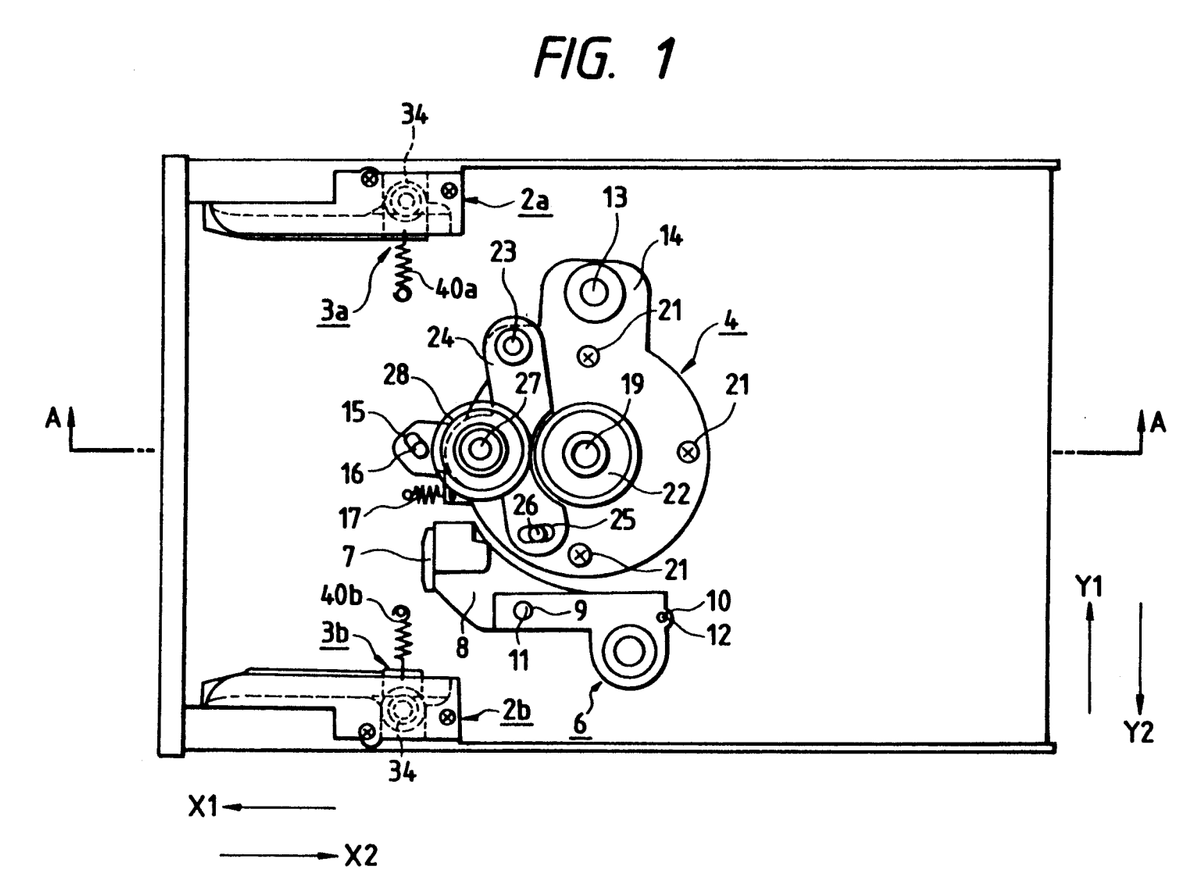
FIG. 1 is a plan view of a cartridge loading device which is an embodiment of the present invention.
Figure 2:
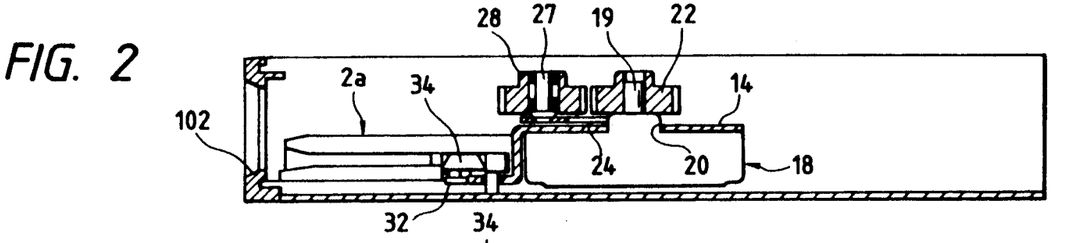
FIG. 2 is a sectional view of the device taken along line A—A in FIG. 1.
Figure 3:
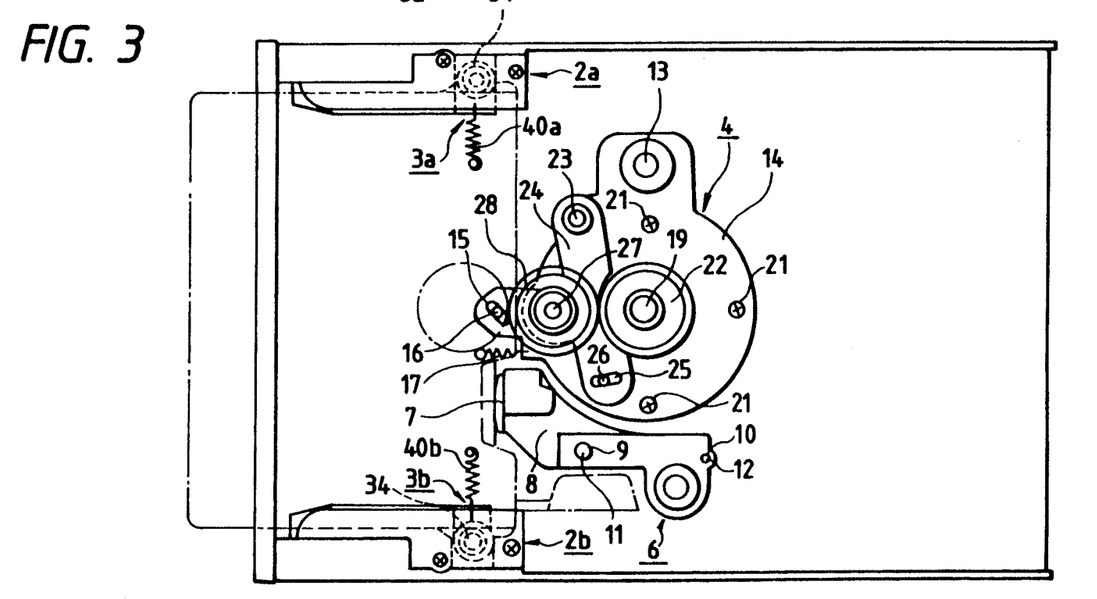
FIG. 3 is a plan view of the device in which a cartridge is loaded.

FIGS. 1 and 3 show an information recording/reproducing apparatus in the state that a cartridge 5 is not loaded in a cartridge loading device and in the state that it is loaded, respectively. FIG. 2 is a sectional view of the apparatus taken along line A—A in FIG. 1.

The information recording/reproducing apparatus includes guide rails 2a and 2b for guiding the cartridge 5 from both sides thereof during its insertion, clampers 3a and 3b for locking and fixing the cartridge 5 when it is inserted to its prescribed loaded position, a drive unit 4 for driving an information recording tape provided in the cartridge 5, and a head unit 6 for recording information on and reproducing recorded information from the tape.

In the head unit 6, a head 7 is held by a head arm 8, and guide shafts 11 and 12 planted on the apparatus main body are inserted into respective holes 9 and 10 of the head arm 8. As a result, the head 7 can be slid in the axial direction of the guide shafts 11 and 12 by a drive mechanism (not shown).

In the drive unit 4, a motor base 14 is pivotally supported at its one end by a shaft 13 provided on the apparatus main body, and a hole 15 is formed at the other end of the motor base 14. A pin 16 provided on the apparatus main body is inserted into the hole 15. The motor base 14 is pulled by a spring 17 in the direction X1, and the swing range of the motor base 14 is restricted by the pin 16 in the hole 15, so that the motor base 14 is kept in the position as shown in FIG. 1.

A motor 18 is secured to the bottom face of the motor base 14 by screws 21 in such a manner that a rotary shaft 19 of the motor 18 protrudes through the hole 20 of the motor base 14. A motor pulley 22 is fitted into the rotary shaft 19, and the peripheral surface (i.e., side surface) of the motor pulley 22 is covered with a rubber material. An idler arm 24 is supported at its one end by a shaft 23 planted on the motor base 14, and has a hole 25 at the other end. A pin 26 on the motor base 14 is inserted into the hole 25 to restrict the swing of the idler arm 24. An idler pulley 28, which is similar to the motor pulley 22, is supported by a shaft 27 on the idler arm 24 so that the idler pulley 28 can be placed in contact with the motor pulley 22.

Figure 4A:
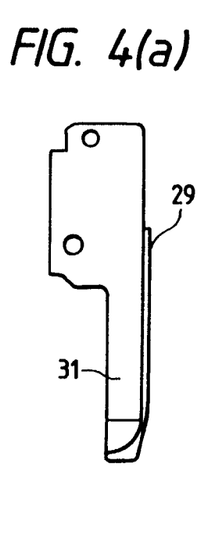
FIGS. 4(a)–4(e) are a plan view, right side view, left side view, front view, and rear view of a guide rail, respectively.
Figure 4B:
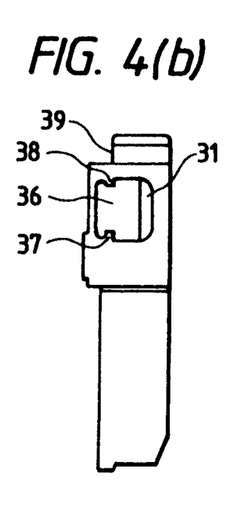
Figure 4C:
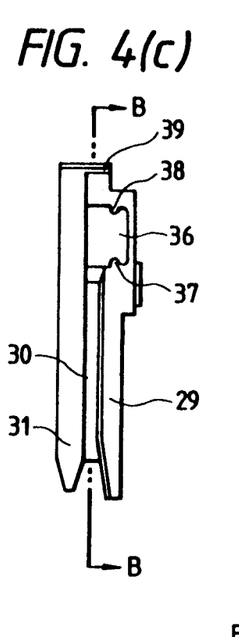
Figure 4D:
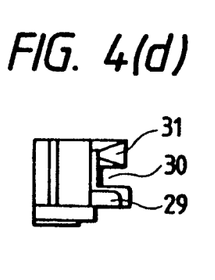
Figure 4E:
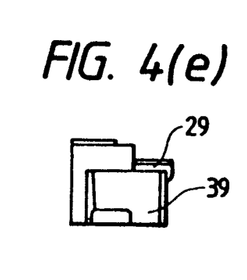
Figure 4F:
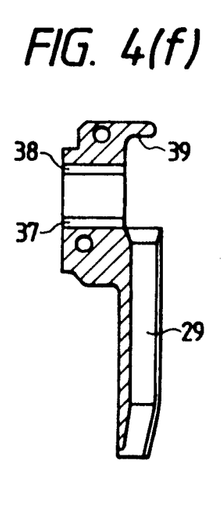
FIG. 4(f) is a sectional view of the guide rail taken along line B—B in FIG. 4(c)

The guide rails 2a and 2b are provided adjacent to the cartridge insertion opening 102 of the apparatus main body. FIGS. 4(a)–4(e) are a plan view, right side view, left side view, front view, and rear view of the guide rail 2a, respectively, and FIG. 4(f) is a sectional view of the guide rail 2a) taken along line B—B in FIG. 4(c). The guide rail 2a includes a base 29, a rail 31 and a guide groove 30 formed therebetween. The base 29, guide groove 30 and rail 31 extend along the insertion direction of the cartridge 5, and the stopper 39 is placed at the end of the guide rail 2a. The other guide rail 2b is constituted symmetrically to the guide rail 2a.

Figure 5A:
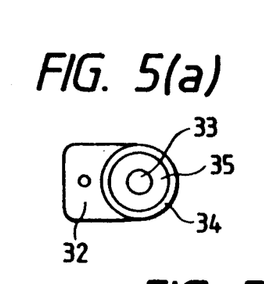
FIGS. 5(a) and 5(b) are a plan view and a side view, partially sectional view, of a clamper, respectively.
Figures 5B, 6:
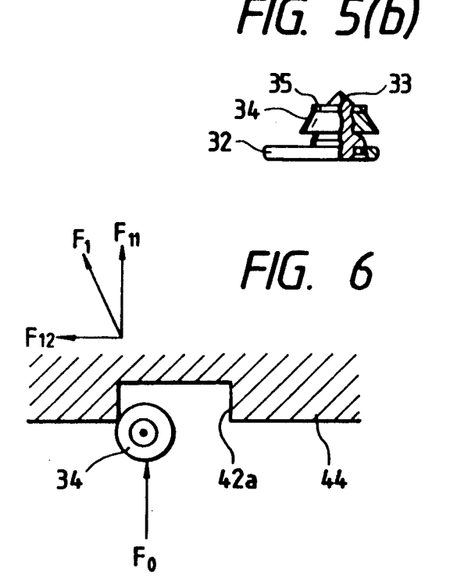
FIGS. 6 and 7 are a plan view and a side view, respectively in which a cartridge is locked by the clamper.

Each of the clampers 3a and 3b includes, as shown in FIGS. 5(a) and 5(b), a clamp arm 32 in the form of a thin plate, a pin 33 provided on the clamp arm 32, a truncated-cone-shaped roller 34 rotatably supported by the pin 33, and a split washer 35 placed on the roller 34 to confine its movement. The clampers 3a and 3b are inserted into the holes 36 (see FIGS. 4(b) and 4(c)) of the respective guide rails 2a and 2b. The holes 36 extend in the directions Y1 and Y2 in FIG. 1. The clamp arms 32 are engaged with the bases 29 of the respective guide rails 2a and 3a by means of guides 37 and 38 so that the clampers 3a and 3b can slide in the directions Y1 and Y2. The clampers 3a and 3b are pulled toward the center line of the apparatus by springs 40a and 40b so that the clampers 3a and 3b are normally kept in contact with the rails 31 of the respective guide rails 2a and 2b.

With the information recording/reproducing apparatus having the structure described above, the cartridge 5 is inserted through the insertion opening 102 of the main body 100, goes along the direction X2 in FIG. 1, and is finally loaded in the main body 100.

Figure 7:
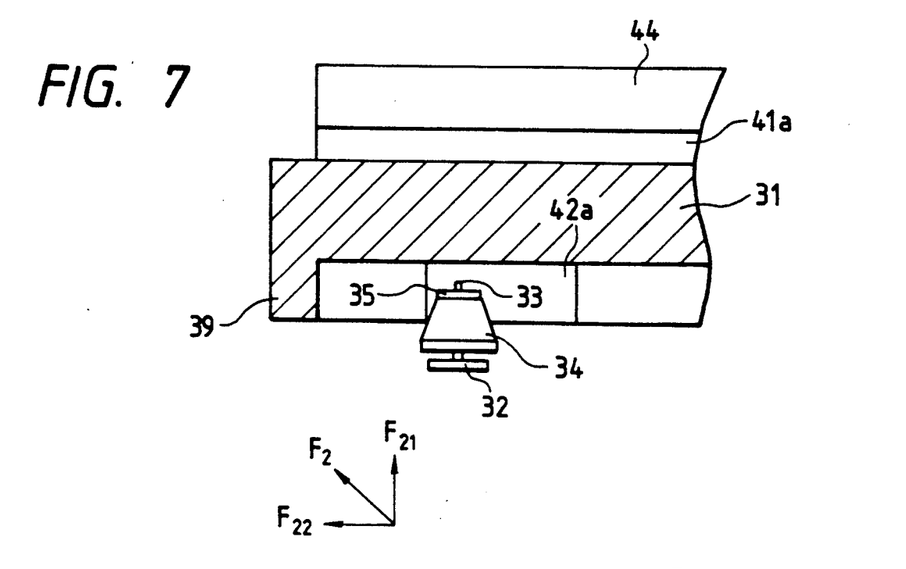
Figure 8:
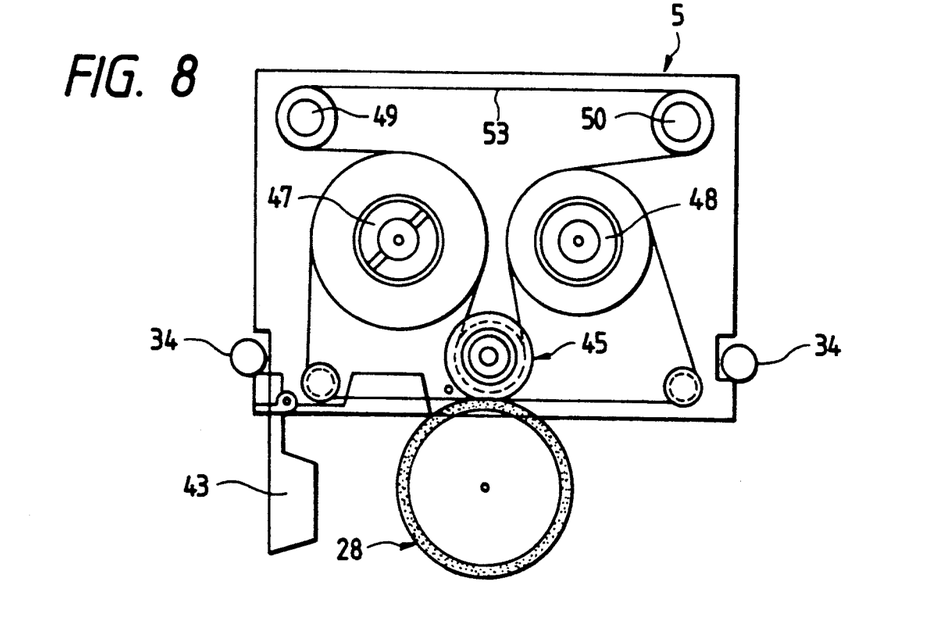
FIG. 8 is a plan view illustrating the positional relationship between the loaded cartridge and an idler pulley.

More specifically, the cartridge 5 is loaded in the following manner. The cartridge 5 is pushed into the main body 100 such that its guide grooves 41a and 41b are engaged with the rails 31 of the respective guide rails 2a and 2b. When the cartridge 5 is inserted into the main body 100, a cover 43 provided in the front face of the cartridge 5 is pushed at its end 43a (see FIG. 10) by the front end of the rail 31 of the guide rail 2b, so that the cover 43 is swung open. When the cartridge 5 is further moved forward, the cartridge 5 comes into contact with the rollers 34 of the clampers 3a and 3b. Upon yet further movement of the cartridge 5, the rollers 34 retreat from the rails 31 against the urging forces of the springs 40a and 40b which are connected to the respective clampers 3a and 3b. Finally, the rollers 34 retreat from the guide grooves 30 of the guide rails 2a and 2b and are moved inward by the urging forces of the springs 40a and 40b to enter the locking notches 42a and 42b of the case 44 of the cartridge 5. As shown in FIGS. 6 and 7, the leading face of the cartridge 5 comes into contact with the stoppers 39 of the guide rails 2a and 2b, and the cartridge 5 is also in contact with the bottom faces of the rails 31.

FIGS. 6 and 7 are a plan view and a side view including the clamper 3a, respectively. The similar situation is provided for the other clamper 3b. As described above, the pulling force $F_0$ of the spring 40a acts on the clamper 3a, so that the roller 34 pushes the edge of locking notch 41a of the case 44 with a force $F_1$. The transverse component $F_{11}$ of the force $F_1$ acts to pinch the cartridge 5, and the longitudinal component $F_{12}$ acts to push the cartridge 5 forward. Further, as shown in FIG. 7, since each of the rollers 34 has the shape of truncated cone, a force $F_2$ acts on the case 44 obliquely upward. The vertical component $F_{21}$ of the force $F_2$ acts to push the cartridge 5 upward, and the longitudinal component $F_{22}$ acts to push the cartridge 5 forward.

Conventionally, the cartridge 5 of the type under consideration has been locked and fixed by pushing it forward and upward. By virtue of the truncated-cone shape of the rollers 34, the pulling force from the spring 40a or 40b, which directly acts on each of the rollers 34, is naturally converted into the forward forces $F_{12}$ and $F_{22}$ and the upward force $F_{21}$.

When the cartridge 5 is locked in its prescribed position, a drive roller 45 of the cartridge 5 is pushed onto the idler pulley 28 (see FIG. 8), which is then pushed onto the motor pulley 22. The torque of the motor 18 is transmitted to the drive roller 45 of the cartridge 5 to move the tape 46, so that the information recording or reproduction is performed.

As described above, according to the present invention, the cartridge pushing members push the cartridge from both sides thereof, rather than from below, so that the operational stroke of the pushing members can be minimized. Since the pushing members are not moved in the direction of the thickness or height of the information recording/reproducing apparatus, the thickness or height can be reduced. Further, since the guide portion for guiding the cartridge and the guide portion for guiding the cartridge-locking clamper are provided in the identical member, the two kinds of guide portions can easily be positioned to each other and the space for installing these parts can be diminished.

What is claimed is:

1. A cartridge loading device for loading a cartridge into a recording/reproducing apparatus, said cartridge including a case containing a recording tape, and having two lateral side faces, each of said side faces having a locking notch disposed therein, and said recording/reproducing apparatus having a loading port and a drive unit for transfer-driving said recording tape, said cartridge loading device comprising;

means for guiding said cartridge to a loaded position within said loading port;

means for locking said cartridge in said loaded position, said locking means including means for engaging said locking notches disposed in said lateral side faces, said engaging means including at least two rollers, each of said rollers being associated with a respective locking notch and having a conical surface contacting a bottom edge of the associated locking notch to urge the cartridge upward and forward when the case is guided to the loaded position, means for urging said rollers inwardly of the locking notches to nip the cartridge in the transverse direction perpendicular to the direction in which said cartridge is guided to the loaded position by said guiding means;

each of said rollers being mounted on a roller supporting arm, said roller supporting arm being slidably connected to said guiding means enabling said roller supporting arm and said roller to slide in said transverse direction.

2. The cartridge loading device of claim 1 wherein said guiding means includes first guide grooves for guiding the cartridge and second guide grooves for guiding the respective roller supporting arms.

3. The cartridge loading device of claim 1 wherein the guiding means has holes into which the respective rollers are inserted.

4. The cartridge loading means of claim 1, wherein said urging means includes at least two springs, each of said springs being biased to urge a respective one of said rollers inward in said transverse direction.

* * * * *